(12) United States Patent
Mohrschladt et al.

(10) Patent No.: US 6,353,085 B1
(45) Date of Patent: Mar. 5, 2002

(54) METHOD FOR PRODUCING POLYAMIDES

(75) Inventors: Ralf Mohrschladt, Schwetzingen; Volker Hildebrandt, Mannheim; Gunter Pipper, Bad Dürkheim; Eberhard Fuchs, Frankenthal, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,321

(22) PCT Filed: Feb. 22, 1999

(86) PCT No.: PCT/EP99/01135

§ 371 Date: Aug. 16, 2000

§ 102(e) Date: Aug. 16, 2000

(87) PCT Pub. No.: WO99/43735

PCT Pub. Date: Sep. 2, 1999

(30) Foreign Application Priority Data

Feb. 26, 1998 (DE) .......................................... 198 08 190

(51) Int. Cl.[7] .......................... C08G 69/14; C08G 69/28
(52) U.S. Cl. ........................ 528/310; 528/312; 528/319; 528/320; 528/322; 528/323; 528/332; 528/335; 528/336

(58) Field of Search ................................ 528/310, 312, 528/319, 320, 322, 323, 332, 335, 336

(56) References Cited

U.S. PATENT DOCUMENTS

| | | | | |
|---|---|---|---|---|
| 4,628,085 A | * | 12/1986 | Mares et al. | 540/539 |
| 5,151,543 A | * | 9/1992 | Ziemecki | 558/459 |
| 5,646,277 A | * | 7/1997 | Fuchs et al. | 540/539 |
| 5,739,324 A | * | 4/1998 | Fuchs et al. | 540/482 |
| 6,252,068 B1 | * | 6/2001 | Fukao et al. | 540/540 |

FOREIGN PATENT DOCUMENTS

| | | |
|---|---|---|
| DE | 25 54 788 | 6/1977 |
| DE | 280 766 | 7/1990 |
| EP | 462 476 | 12/1991 |
| GB | 1148508 | 4/1969 |

* cited by examiner

*Primary Examiner*—P. Hampton-Hightower
(74) *Attorney, Agent, or Firm*—Keil & Weinkauf

(57) ABSTRACT

In a process for producing polyamides by polymerization of lactams in the presence of metal oxides as heterogeneous catalysts, the metal oxides are used in a form which permits mechanical removal from the reaction mixture and are removed from the reaction mixture in the course of or on completion of the polymerization.

8 Claims, No Drawings

METHOD FOR PRODUCING POLYAMIDES

BACKGROUND OF THE INVENTION

1. Field of the Invention

This invention relates to a process for producing polyamides by polymerization of lactams in the presence of metal oxides as heterogeneous catalysts.

The hydrolytic polymerization process is one of the most important processes for producing polyamides from lactams. Acidic catalysts are known to speed up the lactam polymerization.

For instance, the use of mono- and bifunctional acids in the hydrolytic polymerization of caprolactam for the purpose of chain regulation has the advantage that the space-time yield can be improved compared with base-regulated polyamide. EP-A 0 462 476 concerns the use of dicarboxylic acids in nylon-6 production. However, acidic compounds, such as terephthalic acid, adipic acid or isophthalic acid, react with the amino end groups of the resulting polymer chains and thus have a decisive influence on the number of end groups available for condensation and on the rate of the polycondensation. The amount of reactive acidic regulator which can be used is therefore limited by the desired final molecular weight and the required space-time yield when condensing in the melt and in the solid phase.

Acidic, condensation-capable regulators reduce not only the space-time yield of the polymerization but also the amino end group number and thus compromise the dyeing properties of polyamides and especially of nylon fibers, since amino end groups play a leading role in binding dyes to the polymer in numerous applications.

2. Description of the Related Art

GB-B 1 148 508 proposes adding acidic salts, such as $TiCl_2$, $AlCl_3$, $SiCl_4$ and $FeCl_3$, to the reaction mixture to speed up the hydrolytic polymerization process.

DE-C 2 554 788 mentions the use of the metal oxides $TiO_2$, $V_2O_5$, $CrO_3$, $MnO_2$, $CuO$, $CuO_2$, $CoO_3$, $MoO_3$ and $WO_3$ in finely divided form as catalysts, optionally under the additional effect of ionizing radiation. The catalysts, which are used in an amount from 0.1 to 50% by weight, are discharged from the reactor together with the polymer melt and remain in the polymer. The disadvantages of using the abovementioned salts and metal oxides depend on the type of catalyst. For instance, the end product may discolor or the mechanical and rheological properties of the polymer may deteriorate badly. It is also known that the deterioration of the property profile of the polymers becomes noticeable in spinning applications at very low catalyst or filler concentrations.

DD 280 766 proposes the use of a catalyst system which is composed of calcium carbonate, barium sulfate and $TiO_2$ and which is coated with a silica gel ester mixture to prevent discoloration of the end product. In this case too the catalyst remains in the product in an amount from 2 to 10% by weight, which again has an adverse effect on processing and product properties in the case of spinning applications in particular.

Moreover, with all the abovementioned catalysts and catalyst mixtures which contain metal oxides and remain in the end product, a comparatively pronounced light and heat instability has to be assumed, since uncoated, reactive metal oxides are known to possess a pronounced photocatalytic effect and to speed up the degradation of the polymer.

BRIEF SUMMARY OF THE INVENTION

It is an object of the present invention to provide a process for producing polyamides from lactams with an improved space-time yield and improved polymerization economics without the abovementioned product and processing properties being adversely affected.

We have found that this object is achieved according to the invention by a process for producing polyamides by polymerization of lactams in the presence of metal oxides as heterogeneous catalysts, which comprises the metal oxides being used in a form which permits mechanical removal from the reaction mixture and being removed from the reaction mixture in the course of or on completion of the polymerization. The catalysts can be used in the form of pellets, extrudates, fixed beds or catalyst-coated packing elements or internals.

DETAILED DESCRIPTION OF THE INVENTION

The use of metal oxides or metal oxide mixtures as fixed bed catalysts in the polymerization reactor significantly speeds up the molecular weight buildup compared with no fixed bed catalyst being present, whereby the polymerization may advantageously be carried out at reduced temperature and reduced water content.

The reaction mixture is separated from the catalyst material before or after attainment of the desired final viscosity.

To produce polyamide according to the invention, all known monomers can be polymerized in the presence of the catalysts of the invention. In a preferred embodiment of the process of the invention, the starting monomer used is ε-caprolactam. Hereinbelow "caprolactam" is preferably "ε-caprolactam".

As heterogeneous catalysts there can be used known metal oxides, such as zirconium oxide, aluminum oxide, magnesium oxide, cerium oxide, lanthanum oxide and preferably titanium dioxides and also beta-zeolites and sheet-silicates. Particular preference is given to titanium dioxide in the anatase form. The titanium dioxide is preferably at least 70% by weight, particularly preferably at least 90% by weight, especially essentially completely, in the anatase form. Silica gel, zeolites and doped metal oxides, examples of dopants used being ruthenium, copper or fluoride, have also been found to provide a considerable improvement in the reaction of the reactants mentioned. Suitable catalysts are especially notable for the fact that they are Brönsted acid. According to the invention, the heterogeneous catalyst has a macroscopic form which permits mechanical separation of the polymer melt from the catlyst, for example by means of sieves or filters. The invention proposes the use of the catalyst in extrudate or pellet form or as a coating on packing elements.

In another embodiment, the lactam is reacted with homogeneously dissolved acidic cocatalysts or a mixture of different catalytically active compounds in the presence of the abovementioned heterogeneous catalysts. The cocatalysts used are preferably acidic catalysts selected from organic mono- and dicarboxylic acids, inorganic acids, their salts or mixtures thereof, for example the abovementioned carboxylic acids, terephthalic acid, adipic acid, propionic acid and isophthalic acid, or oxygen-containing phosphorus compounds, especially phosphoric acid, phosphorous acid, hypophosphorous acid, their alkali metal and alkaline earth metal salts and ammonium salts, or oxygen-containing sulfur compounds, especially sulfuric acid and sulfurous acid.

The process of the invention is batch or preferably continuously operated. The monomers and the desired comonomers, the chain regulators and the catalysts are melted and mixed either in the polymerization reactor, preferably prior to heating to the reaction temperature, or in a separate makeup vessel prior to being introduced into the reactor. The water content of the starting mixture is within the range from 0 to 20% by weight, preferably within the range from 0 to less than 10% by weight, particularly preferably within the range from 0.005 to 1% by weight.

The way the process is carried out according to the invention can be characterized by temperature-time and pressure-time profiles, which depend on the reactants and catalysts used. The time dependence of pressure and temperature is directly dependent on the progress of the reaction, on the desired molecular weight distribution, or the viscosity of the end product, and on the amount of water to be removed from the reaction mixture.

The molecular weight buildup can be improved if the reaction mixture passes sequentially through a plurality of process phases or stages each having different process parameter (pressure, temperature and residence time) settings. The pressure and temperature time-courses within and between the phases are not necessarily constant or discontinuous, but can also change monotonously and continuously, respectively.

Two-phase Process

Preferably, the polymerization is carried out in at least two phases or stages, the first stage being carried out under an elevated pressure at which the reaction mixture (except for the heterogeneous catalyst) is present as a single liquid phase and the last stage preferably being carried out as a postcondensation under a pressure within the range from 0.01 to 10×10$^5$ Pa, and the heterogeneous catalyst may be present in either or both of the stages. In this case, after heating to the desired reaction temperature, the reaction mixture is reacted at elevated pressures in the first phase and at low pressures in the second phase. The low pressure phase ensures removal of the condensation products formed. The phases may be technically implemented in a single reactor. If the reaction of the reaction mixture in the presence of the fixed bed catalyst is to take place in one production phase only, spatial separation of the phases is advisable.

If the production phases are to be separate, the metal oxide catalyst is preferably used in the first production phase, since the reaction mixture has a comparatively low viscosity during the first phase, allowing a more effective separation of the resulting prepolymer melt from the catalyst. In this case, the necessary separation of the converted reaction mixture from the fixed bed catalyst takes place for example by transferring the reaction mixture into a second reactor which does not contain a fixed bed catalyst. This embodiment has the advantage of good contact of the reactants with the catalyst surface.

In another procedure, the reaction mixture is present in the first production phase as a gaseous-liquid two-phase system, in a sealed reactor. The gas volume present cannot be exchanged, so that the molecular weight buildup is restricted by the given water content of the polymer melt and by the gas volume. Subsequent phases, especially a postcondensation of the product, are preferably preceded by a separation of the reaction mixture from the fixed bed catalyst, for example by transferring the intermediate a catalyst-free reactor volume.

By polymerizing the lactams with less than 1% by weight of water in the presence of the catalyst it is possible to obtain a high molecular weight in the production of polyamide. In this case, it is again advantageous to separate the prepolymer melt from the fixed bed catalyst prior to the polycondensation—at low pressures—to the desired final viscosity. In a preferred method of producing polyamides using very little water, the first phase of the polymerization is carried out at elevated pressure in a sealed system with the reaction mixture present as a single liquid phase or as a gaseous-liquid two-phase system, i.e., without removal of condensation products, and the subsequent phases at low pressures—for postcondensation If the reaction mixture is reacted in the presence of the fixed bed catalyst, then the bulk temperature of the mixture is preferably within the range from 190 to 300° C., more preferably within the range from 220 to 290° C., particularly preferably within the range from 230 to 280° C. The lower temperature limit here also depends on the degree of polymerization and on the water content of the melt, since a liquid-solid phase transition is to be absolutely avoided. When no fixed bed catalyst is employed, the bulk temperature is preferably within the range from 220 to 350° C., more preferably within the range from 240 to 290° C., particularly preferably within the range from 260 to 280° C.

The reaction vessels used are packed with the catalyst material in such a way as to maximize the catalyst surface area available to all volume elements of the reaction solution. If desired, the reaction mixture can be recirculated to improve the exchange of reactants at the catalyst surface.

As the Examples hereinbelow show, a viscosity sufficient for many applications can be achieved in the sealed reaction system even without postcondensation, i.e., by means of only one production phase.

Three-phase Process

In another preferred embodiment, the reaction mixture is reacted in three phases. A first high pressure phase, in which the reactants are present as a single liquid phase, is followed by a two-phase high pressure phase in an open reactor which permits removal of condensation products. In a third, low-pressure phase, finally, the desired degree of polymerization is achieved by postcondensation and efficient water removal.

All the production phases described above can be implemented in a single reactor, in this embodiment, too. Preferably, the reaction mixture to be postcondensed at low pressures is transferred into a reactor volume which is catalyst-free. The catalyst is removed mechanically, for example by means of filters, grids and/or sieves.

In the last, postcondensation phase of the multiphase production process, the reaction mixture, or, to be more precise, the prepolymer melt, is postcondensed at pressures which are preferably within the range from 0.01 to 10×10$^5$ Pa, particularly preferably within the range from 10 to 300×10$^5$ Pa. If desired, an inert gas can be passed over the product mixture. The duration of the postcondensation phase thus initiated then determines the degree of polymerization of the polyamide melt formed and ranges from 0 to 10 hours, depending on the water content of the reaction mixture. Very highly viscous polyamides may require postcondensation times of more than 10 hours.

It is possible to carry out the postcondensation in the presence of the catalyst mixture. Separating catalyst and reaction mixture prior to the postcondensation phase increases the catalyst onstream time. Preferably, therefore, the reaction mixture is (prior to decompression to low pressures) transferred into a catalyst-free reactor via sieves, grids and/or filters whose filtering limit is 20 μm to retain the catalyst and thus separate it from the reaction mixture.

As part of the process of the invention, it is also possible to carry out a chain lengthening or a branching or a combination thereof. For this purpose, known substances for branching or for chain-lengthening polymers are added to the reaction mixture. The substances can be added both to the starting mixture and to the reaction mixture which is postcondensed. Usable substances are:

Trifunctional amines or carboxylic acids as branching agents or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, which can be prepared for example from oleic acid and can have from 50 to 60 carbon atoms, naphthalenepolycarboxylic acids, such as naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I

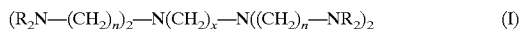
$$(R_2N-(CH_2)_n)_2-N(CH_2)_x-N((CH_2)_n-NR_2)_2 \quad (I)$$

where
R is H or $-(CH_2)_n-NR^1{}_1$, where
$R^1$ is H or $-(CH_2)_n-NR^2{}_2$, where
$R^2$ is H or $-(CH_2)_n-NR^3{}_2$, where
$R^3$ is H or $-(CH_2)_n-NH_2$,
n is an integer from 2 to 6, and
x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a $-(CH_2)_n-NH_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanine, naphthalocyanine. Preference is given to 3,5,3',5'-biphenyltetracarboxylic acid-phthalocyanine, naphthalocyanine, 3,5,5', 5'-biphenyl-tetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are commercially available or can be prepared by the process described in DE-A-43 12 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids.

However, small amounts of at least trifunctional amines may be present in the trifunctional carboxylic acids, and vice versa.

The substances are present in an amount from 1 to 50 ?mol/g of polyamide, preferably from 1 to 35, particularly preferably 1 to 20, ?mol/g of polyamide. The substances are preferably present in an amount from 3 to 150, particularly preferably from 5 to 100, especially from 10 to 70, ?mol of equivalents/g of polyamide. The equivalents are based on the number of functional amino groups or carboxylic acid groups.

Difunctional carboxylic acids or difunctional amines are used as chain lengtheners. These have 2 carboxylic acid groups which can be reacted with amino groups, or 2 amino groups which can be reacted with carboxylic acids. The difunctional carboxylic acids or amines, besides the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as $C_{1-14}$-alkylenediamine, preferably $C_{2-6}$-alkylenediamine, for example hexylenediamine. They can also be cycloaliphatic. Examples are isophoronediamine, laromine. Branched aliphatic diamines are likewise usable, an example being Vestamin TMD (trimethylhexamethylenediamine, from Hüls AG). Entire amines can each be substituted by $C_{1-12}$-alkyl, preferably $C_{1-14}$-alkyl, radicals on the carbon skeleton.

Difunctional carboxylic acids are for example those which form salts with difunctional diamines. They can be linear aliphatic dicarboxylic acids, which are preferably $C_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The reaction mixture may have added to it additives and fillers, aliphatic and aromatic chain regulators such as mono- and bifunctional amines and acid and also heat stabilizers, photostabilizers and substances to improve the dyeability of the polymer. Substances which are not homogeneously dissolved in the reaction mixture, such as pigments and fillers, are preferably added to the reaction mixture after the production phases which take place in the presence of the fixed bed catalyst.

Pigments and dyes are generally present in amounts of up to 4%, preferably from 0.5 to 3.5%, especially from 0.5 to 3%, by weight.

The pigments for coloring thermoplastics are commonly known, see for example R. Gächter and H. Müller, Taschenbuch der Kunststoffadditive, Carl Hanser Verlag, 1983, pages 494 to 510. The first preferred group of pigments to be mentioned are white pigments such as zinc oxide, zinc sulfide, lead white (2 $PbCO_3$, $Pb(OH)_2$), lithopone, antimony white and titanium dioxide. Of the two most common crystal polymorphs (rutile and anatase) of titanium dioxide, the rutile form is preferred for use as white pigment for the molding compositions of the invention.

Black pigments which can be used according to the invention are iron oxide black ($Fe_3O_4$), spinel black (Cu(Cr, Fe)$_{2O4}$), manganese black (mixture of manganese dioxide, silicon dioxide and iron oxide), cobalt black and antimony black and also, particularly preferably, carbon black, which is usually used in the form of furnace or gas black (see G. Benzing, Pigmente für Anstrichmittel, Expert-Verlag (1988), p. 78ff).

It will be appreciated that inorganic color pigments such as chromium oxide green or organic color pigments such as azo pigments and phthalocyanines can be used according to the invention to obtain certain hues. Such pigments are generally commercially available.

It can further be of advantage to use the abovementioned pigments or dyes in a mixture, for example carbon black with copper phthalocyanines, since this generally facilitates the dispersion of color in the thermoplastic.

Oxidation retardants and thermal stabilizers which can be added to the thermoplastic compositions of the invention include for example halides of metals of group I of the periodic table, e.g., sodium halides, potassium halides, lithium halides, optionally in conjunction with copper(I) halides, for example chlorides, bromides or iodides. The halides, especially of copper, may also contain electron-rich p-ligands. Examples of such copper complexes are copper halide complexes with triphenylphosphine, for example. It is further possible to use zinc fluoride and zinc chloride. Other possibilities are sterically hindered phenols, hydroquinones, substituted representatives of this group, secondary aromatic amines, optionally in conjunction with phosphorus-containing acids and salts thereof, and mixtures of these compounds, preferably in a concentration up to 1% by weight, based on the weight of the mixture.

Examples of UV stabilizers are various substituted resorcinols, salicylates, benzotriazoles and benzophenones, which are generally used in amounts of up to 2% by weight.

Lubricating and demolding agents, which are generally included in the thermoplastic material in amounts of up to 1% by weight, are stearic acid, stearyl alcohol, alkyl stearates and N-alkylstearamides and also esters of pentaerythritol with long-chain fatty acids. It is also possible to use salts of calcium, of zinc or of aluminum of stearic acid and also dialkyl ketones, for example distearyl ketone.

The polyamides of the invention, especially nylon-6 and its copolymers, can be used for producing fibers or fabrics and materials of construction. Appropriate processes are described in EP-A-0 462 476, for example.

In a preferred embodiment, the level of low molecular weight constituents such as caprolactam, linear and cyclic oligomers in the polyamide produced according to the invention can be reduced by subjecting the polyamide to an extraction with first an aqueous solution of caprolactam and then with water and/or to a gas phase extraction.

The Examples hereinbelow illustrate the invention.

EXAMPLES

The Examples compare the polymerization of caprolactam in a one-phase process in a sealed reactor and in a two-phase process with an additional decompression phase in an open reactor in the presence of a fixed bed catalyst with the same polymerizations without fixed bed catalyst. Production processes utilizing different temperature and residence-time profiles and also utilizing high or low water content in the starting mixture are contrasted.

Analysis

The relative viscosity (RV), a measure of the molecular weight buildup and the degree of polymerization, is measured in 1% strength by weight solution in the case of extracted material and in 1.1% strength by weight solution in the case of unextracted polymer, in 96% strength sulfuric acid, at 25° C. using an Ubbelohde viscometer. Unextracted polymers are dried under reduced pressure for 20 hours prior to analysis.

The amino and carboxyl end group contents were determined on extracted polycaprolactam by an acidimetric titration. The amino groups were titrated with perchloro acid in 70:30 (parts by weight) phenol/methanol as solvent. The carboxyl end groups were titrated with potassium hydroxide solution in benzyl alcohol as solvent.

For extraction, 100 parts by weight of polycaprolactam are stirred with 400 parts by weight of demineralized water at 100° C. for 32 hours under reflux and, after removal of the water, dried gently, i.e., without risk of postcondensation, at 100° C. under reduced pressure for 20 hours.

Catalyst

The heterogeneous catalyst used is titanium dioxide in extrudate form having a diameter of 4 mm and a length within the range from 5 to 20 mm. The titanium dioxide of the catalyst is all anatase (Finnti, type S150).

Production in Batch Vessel: Examples 1–8

The runs are carried out in an autoclave with or without catalyst pellets, the bed of pellets completely covering the reaction mixture, which contains 10% by weight of water. After the reactants and, as the case may be, the catalyst have been introduced, the autoclave is sealed, vented and repeatedly flushed with nitrogen. The heating-up phase to the desired reaction temperature at a pressure of up to 18 bar, manually regulated with a valve, is followed by decompression of the autoclave to ambient pressure (about 1 bar), so that the prepolymer melt formed can be postcondensed. The temperatures, pressures and the description of the procedures are listed in Table 1. Both the postcondensation and decompression times and the reaction temperatures are varied.

TABLE 1

Exemplary runs in batch vessel

| Procedure | Caprolactam in autoclave . . . |
|---|---|
| A | . . . plus 10% by weight of $H_2O$ heated over 85 min to 270° C., pressure maintained at 18 bar by decompression, system decompressed to 1 bar over 60 min and postcondensed at 270° C. and 1 bar for 1 hour. |
| B | . . . plus 10% by weight of $H_2O$ heated over 85 min to 270° C., pressure maintained at 18 bar by decompression, system decompressed to 1 bar over 60 min and autoclave discharged without postcondensation. |
| C | . . . plus 10% by weight of $H_2O$ heated over 85 min to 270° C., pressure maintained at 18 bar by decompression, system decompressed to 1 bar over 20 min and autoclave emptied without postcondensation. |
| D | . . . plus 10% by weight of $H_2O$ heated over 85 min to the desired reaction temperature T, pressure maintained at 18 bar by decompression, system decompressed to 1 bar over 60 min and autoclave emptied without postcondensation. |
| E | . . . plus 0.4% by weight of $H_2O$ heated over 85 min to 270° C., pressure maintained at 18 bar by decompression, system decompressed to 1 bar over 60 min and autoclave discharged without postcondensation. |

The tables summarize the product properties of the polymer as a function of the procedure. The experiments involving different reaction times are listed in Table 2 and the experiments involving different reaction temperatures in Table 3. Table 1 describes the laboratory autoclave procedures.

TABLE 2

Hydrolytic polymerization of caprolactam in the presence of titanium dioxide catalyst. Variation of reaction times

| Inv./ Comp. Ex. | Catalyst | Procedure (see Tab. 1) | RV | AEG | CEG |
|---|---|---|---|---|---|
| 1 Comparison | with | A | 2.38 | 83 | 32 |
| C1 | without | A | 2.38 | 67 | 68 |
| 2 | with | B | 1.98 | 96 | 79 |

TABLE 2-continued

Hydrolytic polymerization of caprolactam in the presence of titanium dioxide catalyst. Variation of reaction times

| Inv./ Comp. Ex. | Catalyst | Procedure (see Tab. 1) | RV | AEG | CEG |
|---|---|---|---|---|---|
| Comparison | | | | | |
| C2 | without | B | 1.86 | 111 | 106 |
| 3 | with | C | 2.01 | 99 | 87 |
| Comparison | | | | | |
| C3 | without | C | 1.74 | 136 | 131 |

RV: relative viscosity
AEG: amino end group content
CEG: carboxyl end group content The Examples show a considerably faster increase in the viscosity with increasing reaction time when the polymerization is carried out in the presence of a fixed bed catalyst. Moreover, even at a reaction temperature of only 230° C., the presence of the catalyst provides high product viscosities (see Table 3).

TABLE 3

Hydrolytic polymerization of caprolactam in the presence of titanium dioxide catalyst. Variation of reaction temperature

| Inv./ Comp. Ex. | Catalyst | Procedure (see Tab. 1) | T [° C.] | RV | AEG | CEG |
|---|---|---|---|---|---|---|
| 4 | with | D | 270 | 1.98 | 96 | 79 |
| Comparison | | | | | | |
| C4 | without | D | 270 | 1.86 | 111 | 106 |
| 5 | with | D | 250 | 1.94 | 103 | 91 |
| Comparison | | | | | | |
| C5 | without | D | 250 | 1.78 | 127 | 124 |
| 6 | with | D | 230 | 1.92 | 106 | 103 |
| Comparison | | | | | | |
| C6 | without | D | 230 | 1.60 | 171 | 165 |
| 7 | with | D | 210 | 1.70 | 138 | 130 |
| Comparison | | | | | | |
| C7 | without | D | 210 | 1.00 | — | — |
| 8 | with | E | 250 | 2.73 | 40 | 80 |
| Comparison | | | | | | |
| C8 | without | E | 250 | 1.05 | — | — |

Experiments in Scaled Reactor: Examples 9–16.

Caprolactam plus 50% by weight of $TiO_2$ pellets and 0.6% by weight of water, each based on the mass of monomer used, are introduced into a glass reactor, which is then sealed under nitrogen. The reaction mixture together with the fixed bed catalyst occupies about 2/3 of the reactor volume. The reactor heated to the selected reaction mixture bulk temperature is cooled down, and emptied, after reaction times of 2, 4, 8 or 16 hours within a few minutes. The polymer obtained is then chipped and analyzed.

The dependence of the relative product viscosity on the reaction time, listed in Tables 4 and 5, provides clear evidence that the polymerization is greatly speeded up in the presence of a fixed bed metal oxide catalyst.

TABLE 4

Hydrolytic polymerization of caprolactam in the presence of titanium dioxide catalyst in sealed reactor at 230° C. Variation of reaction time

| Inv./ Comp. Ex. | Catalyst | Reaction time | T [° C.] | RV |
|---|---|---|---|---|
| 9 | with | 2 | 230° C. | 1.68 |
| Comparison C9 | without | 2 | 230° C. | 1.02 |
| 10 | with | 4 | 230° C. | 2.08 |
| Comparison C10 | without | 4 | 230° C. | 1.02 |
| 11 | with | 8 | 230° C. | 2.40 |
| Comparison C11 | without | 8 | 230° C. | 1.18 |
| 12 | with | 16 | 230° C. | 2.40 |
| Comparison C12 | without | 16 | 230° C. | 2.29 |

TABLE 5

Hydrolytic polymerization of caprolactam in the presence of titanium dioxide catalyst in sealed reactor at 250° C. Variation of reaction time

| Inv./ Comp. Ex. | Catalyst | Reaction time | T [° C.] | RV |
|---|---|---|---|---|
| 13 | with | 2 | 250° C. | 1.97 |
| Comparison C13 | without | 2 | 250° C. | 1.02 |
| 14 | with | 4 | 250° C. | 2.10 |
| Comparison C14 | without | 4 | 250° C. | 1.21 |
| 15 | with | 8 | 250° C. | 2.15 |
| Comparison C15 | without | 8 | 250° C. | 2.16 |
| 16 | with | 16 | 250° C. | 2.15 |
| Comparison C16 | without | 16 | 250° C. | 2.51 |

We claim:

1. A process for producing polyamides by polymerization of lactams in the presence of metal oxides as heterogeneous catalysts, wherein the metal oxide catalysts are used in the form of pellets, extrudates, fixed beds or catalyst-coated packing elements or internals, which permits mechanical removal from the reaction mixture and being removed from the reaction mixture in the course of or on completion of the polymerization, wherein the reaction is carried out in the presence of less than 10% by weight of water, based on the entire reaction mixture.

2. A process as claimed in claim 1, wherein the metal oxide catalysts are selected from zirconium oxide, aluminum oxide, magnesium oxide, cerium oxide, lanthanum oxide, titanium dioxide, beta-zeolites and sheet-silicates.

3. A process as claimed in claim 2, wherein the metal oxide catalyst used is titanium dioxide which is at least 70% by weight in the anatase form.

4. A process as claimed in claim 1, wherein the metal oxide catalyst used is titanium dioxide which is at least 70% by weight in the anatase form.

5. A process as claimed in claim 1, wherein the metal oxide catalysts are used together with acidic cocatalysts in homogeneous solution in the reaction mixture.

6. A process as in claim 1, wherein the polymerization of the lactams is carried out in the presence of organic monocarboxylic acids, dicarboxylic acids or their mixtures as chain regulators and/or cocatalysts.

7. A process as claimed in claim 1, wherein the polymerization of the lactams is carried out in the presence of organic monocarboxylic acids, dicarboxylic acids or their mixtures as chain regulators and/or cocatalysts.

8. A process as claimed in claim 1, wherein the polymerization is carried out in at least two stages, the first stage being carried out under an elevated pressure at which the reaction mixture (except for the heterogeneous catalyst) is present as a single liquid phase and the last stage being carried out as a postcondensation under a pressure within the range from 0.01 to $10 \times 10^5$ Pa, and the heterogeneous catalyst may be present in either or both of the stages.

* * * * *